(12) United States Patent
Chiang

(10) Patent No.: US 8,068,324 B2
(45) Date of Patent: Nov. 29, 2011

(54) CIRCUIT AND METHOD FOR PROTECTING ENERGY-STORAGE DEVICE

(75) Inventor: Chin-Tsai Chiang, Taoyuan County (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 394 days.

(21) Appl. No.: 12/145,893

(22) Filed: Jun. 25, 2008

(65) Prior Publication Data
US 2009/0002908 A1    Jan. 1, 2009

(30) Foreign Application Priority Data
Jun. 28, 2007 (TW) ................... 96123603 A

(51) Int. Cl.
*H02H 3/22* (2006.01)
*H02H 3/00* (2006.01)
*H02H 9/08* (2006.01)
(52) U.S. Cl. .......................... 361/111; 361/42
(58) Field of Classification Search .............. 361/111, 361/42
See application file for complete search history.

(56) References Cited

U.S. PATENT DOCUMENTS

| | | | | |
|---|---|---|---|---|
| 3,973,169 A | * | 8/1976 | Titus | 361/17 |
| 4,653,084 A | * | 3/1987 | Ahuja | 379/27.06 |
| 5,392,188 A | * | 2/1995 | Epstein | 361/118 |
| 6,034,611 A | * | 3/2000 | Brooks et al. | 340/647 |
| 7,430,101 B2 | * | 9/2008 | Komulainen et al. | 361/111 |

FOREIGN PATENT DOCUMENTS

| | | | |
|---|---|---|---|
| CN | 2593434 Y | * | 1/2003 |
| CN | 2593434 Y | | 12/2003 |
| TW | 200721645 | | 6/2006 |
| TW | 200625362 | | 7/2006 |
| TW | 200701586 | | 1/2007 |

OTHER PUBLICATIONS

Search Report for TW Appln. No. 096123603, dated Jul. 29, 2010.

* cited by examiner

*Primary Examiner* — Jared Fureman
*Assistant Examiner* — Lucy Thomas
(74) *Attorney, Agent, or Firm* — Volpe and Koenig, P.C.

(57) ABSTRACT

A protection circuit including an energy-storage device, a fusible element, and an overvoltage modulation unit is provided. The energy-storage device stores a first energy and supplies the first energy. The fusible element connected in series with the energy-storage device for constituting a branch circuit. The overvoltage modulation unit is connected in parallel with the branch circuit, wherein when the branch circuit begins to have an overvoltage, an absolute value of a modulating current flowing through the overvoltage modulation unit is increased instantaneously, so that a second energy instantaneously released from the energy-storage device is applied to cut off the fusible element.

14 Claims, 6 Drawing Sheets

ABSTRACT/PATENT OCR:

CIRCUIT AND METHOD FOR PROTECTING ENERGY-STORAGE DEVICE

FIELD OF THE INVENTION

The present invention relates to a circuit and a method for protecting an energy-storage device, and more particularly to a circuit and a method for protecting an energy-storage device from an overvoltage.

BACKGROUND OF THE INVENTION

An instantaneous voltage may happen on any electronic device and is generally caused by a circuit fault, a clap of thunder, or an electrostatic discharging. Components usually used for an overvoltage protection in a circuit involve a diode, a metal oxide varistor (MOV), a multilayer varistor (MLV), a transient voltage suppresser (TVS), and a surge protector.

An overvoltage of a circuit usually occurs with an overcurrent. Generally, a fuse is an element used for an overcurrent protection.

A capacitor is an energy-storage device. In an inductive circuit, in order to increase the power factor and the efficiency, a power capacitor is usually connected in parallel to the power system for compensating virtual work. The damage reason of the power capacitor is the insulation deterioration caused by an overvoltage.

In order that both the deterioration of the energy-storage device and the safety problem induced therefrom are avoided due to the overvoltage, it is necessary to seek architecture of a simple circuit for protecting the energy-storage device.

SUMMARY OF THE INVENTION

It is an object of the present invention to provide a circuit and a method for protecting an energy-storage device. The destruction and the safety problem resulted from an overvoltage of the energy-storage device is prevented. Therefore, the effect of accurate response and simple architecture is accomplished through the circuit and the method.

It is therefore a first aspect of the present invention to provide a protection circuit including an energy-storage device, a fusible element, and an overvoltage modulation unit. The energy-storage device stores a first energy and supplies the first energy. The fusible element connected in series with the energy-storage device for constituting a branch circuit. The overvoltage modulation unit is connected in parallel with the branch circuit, wherein when the branch circuit begins to have an overvoltage, an absolute value of a modulating current flowing through the overvoltage modulation unit is increased instantaneously, so that a second energy instantaneously released from the energy-storage device is applied to cut off the fusible element.

It is therefore a second aspect of the present invention to provide a method for protecting an energy-storage device, wherein the energy-storage device is used for storing a first energy and is connected in series with a fusible element for constituting a branch circuit connected in parallel with an overvoltage modulation unit. The method includes the following steps. An instantaneous increase of an absolute value of a modulating current flowing through the overvoltage modulation unit is caused when the branch circuit begins to have an overvoltage. A second energy is instantaneously released from the energy-storage device by the instantaneous increase of the absolute value, so that the fusible element is cut off.

It is therefore a third aspect of the present invention to provide a protection circuit including an energy-storage device, a fusible element, a power factor correction converter, and an overvoltage modulation unit. The energy-storage device stores a first energy and supplies the first energy. The fusible element connected in series with the energy-storage device for constituting a branch circuit. The power factor correction converter coupled to the branch circuit for controlling a charging and a discharging of the capacitive device. The overvoltage modulation unit is connected in parallel with the branch circuit, wherein when the branch circuit begins to have an overvoltage, an absolute value of a modulating current flowing through the overvoltage modulation unit is increased instantaneously, so that a second energy instantaneously released from the energy-storage device is applied to cut off the fusible element.

The above objects and advantages of the present invention will become more readily apparent to those ordinarily skilled in the art after reviewing the following detailed descriptions and accompanying drawings, in which:

DETAIL DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
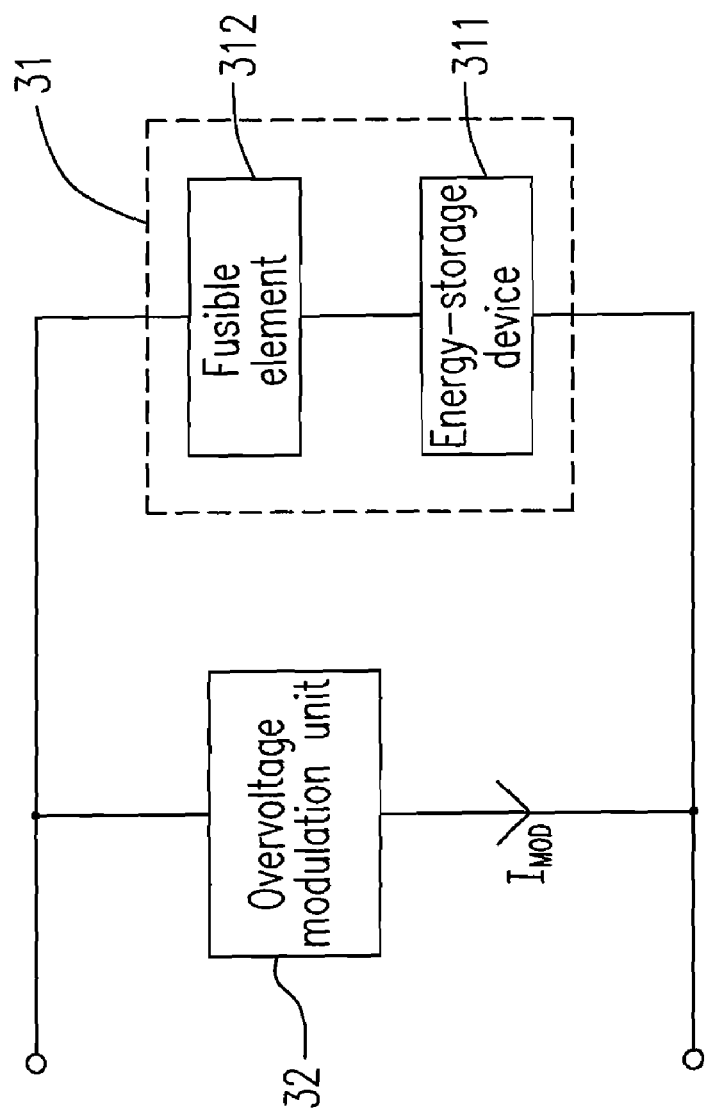
FIG. 1 is a schematic block diagram showing architecture of a circuit for protecting an energy-storage device according to the present invention.

Please refer to FIG. 1, which is a schematic block diagram showing architecture of a circuit for protecting an energy-storage device according to the present invention. In FIG. 1, the protection circuit 81 includes an energy-storage device 311, a fusible element 312, and an overvoltage modulation unit 32. The energy-storage device 311 stores a first energy and supplies the first energy. The energy-storage device 311 includes, e.g., a capacitor and has a maximum rated voltage.

The fusible element 312 is connected in series with the energy-storage device 311 for constituting a branch circuit 31. A fusible element 312 commonly involves, e.g., a fuse, which has the property of both low melting-point temperature and suitable resistance. When the heat generated on the fuse exceeds a rated value, the fuse will be melted out for protecting the device connected in series with the fuse. The fusible element 312 can also include, e.g., a resistor. Preferably a resistor the property of which is easily burned out due to overheat is selected and is connected in series with the protected device. In order that the voltage applied to the energy-storage device 311 does not exceed the maximum rated voltage thereof, the terminal voltage of the branch circuit 31 is controlled to make it less than a limiting voltage. The limiting voltage is assigned to be less than the maximum rated voltage by a safety value for preventing the energy-storage device 311 from an overvoltage.

The overvoltage modulation unit 32 is connected in parallel with the branch circuit 31 and has a switching voltage and a modulating current $I_{MOD}$. The element property of the overvoltage modulation unit 32 is chosen, which can make the switching voltage equal to the limiting voltage of the branch circuit 31. When the instantaneous voltage happened on the branch circuit 31 exceeds the limiting voltage or the switching voltage, that is, the branch circuit 31 begins to have an overvoltage, an absolute value of the modulating current $I_{MOD}$ flowing through the overvoltage modulation unit 32 is increased instantaneously. Because the overvoltage modulation unit 32 is connected in parallel with the branch circuit 31, a second energy instantaneously released from the energy-storage device 311 is applied to the fusible element 312. Therefore, a current flowing through the fusible element 312 will exceeds a maximum rated current thereof, which makes the fusible element 312 have overheat and make the fusible element 312 cut off. The overvoltage modulation unit 32 commonly involves, e.g., a transient voltage suppresser, a surge protection unit, or a thyristor, and so on.

Figure 2:
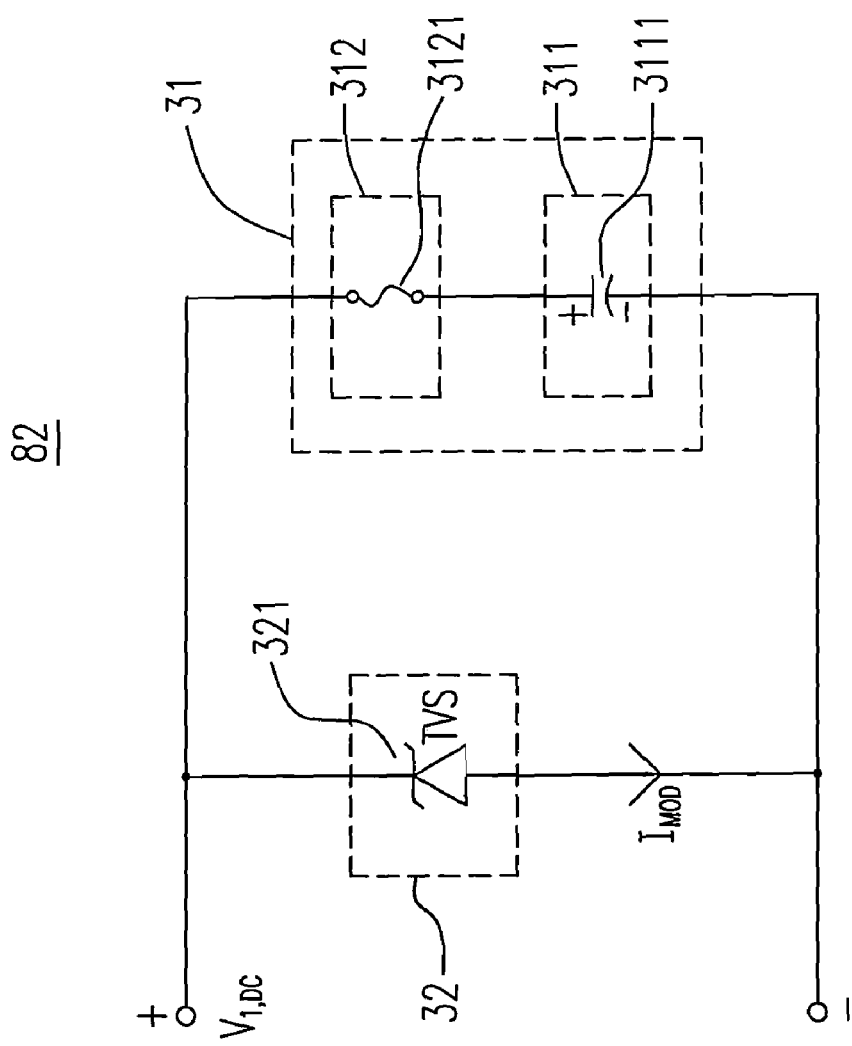
FIG. 2 is a schematic diagram showing a circuit for protecting an energy-storage device according to the first embodiment of the present invention.

Please refer to FIG. 2, which is a schematic diagram showing a circuit for protecting an energy-storage device according to the first embodiment of the present invention. The protection circuit 82 in FIG. 2 is the first configuration of the protection circuit 81 in FIG. 1. The identical reference numerals have the same functions in the two figures, and it is unnecessary to repeat here again. As shown in FIG. 2, the energy-storage device 311 includes a capacitor 3111, the fusible element 312 includes a fuse 3121, and the overvoltage modulation unit 32 includes a transient voltage suppresser 321. The transient voltage suppresser 321 is connected in parallel with the branch circuit 31 and is powered by a DC voltage $V_{1,DC}$.

Figure 3:
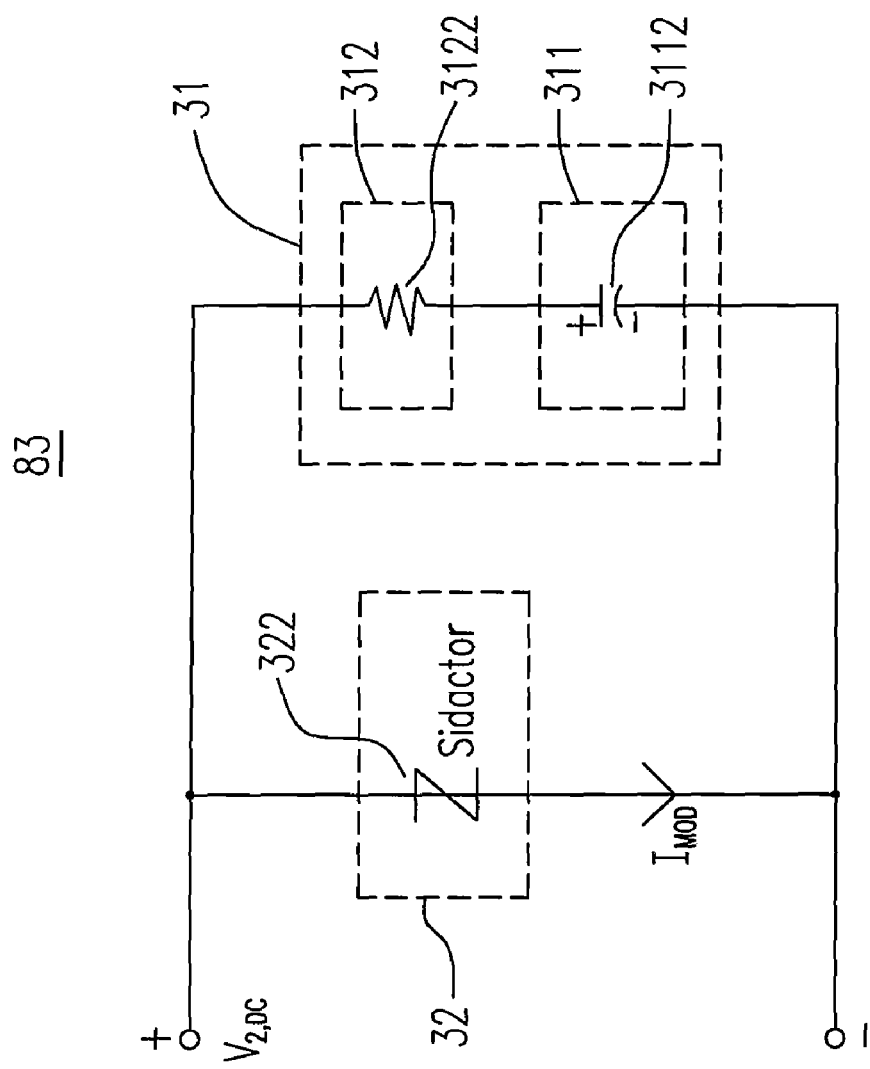
FIG. 3 is a schematic diagram showing a circuit for protecting an energy-storage device according to the second embodiment of the present invention.

Please refer to FIG. 3, which is a schematic diagram showing a circuit for protecting an energy-storage device according to the second embodiment of the present invention. The protection circuit 83 in FIG. 3 is the second configuration of the protection circuit 81 in FIG. 1. The identical reference numerals have the same functions in the two figures, and it is unnecessary to repeat here again. As shown in FIG. 3, the energy-storage device 311 includes a capacitor 3112, the fusible element 312 includes a resistor 3122, and the overvoltage modulation unit 32 includes a surge protection unit 322. The surge protection unit 322 commonly involves a surge absorber or a thunder protector, and so on; e.g., a Sidactor element is a kind of the surge absorber. The surge protection unit 322 is connected in parallel with the branch circuit 31 and is powered by a DC voltage $V_{2,DC}$.

Figure 4:
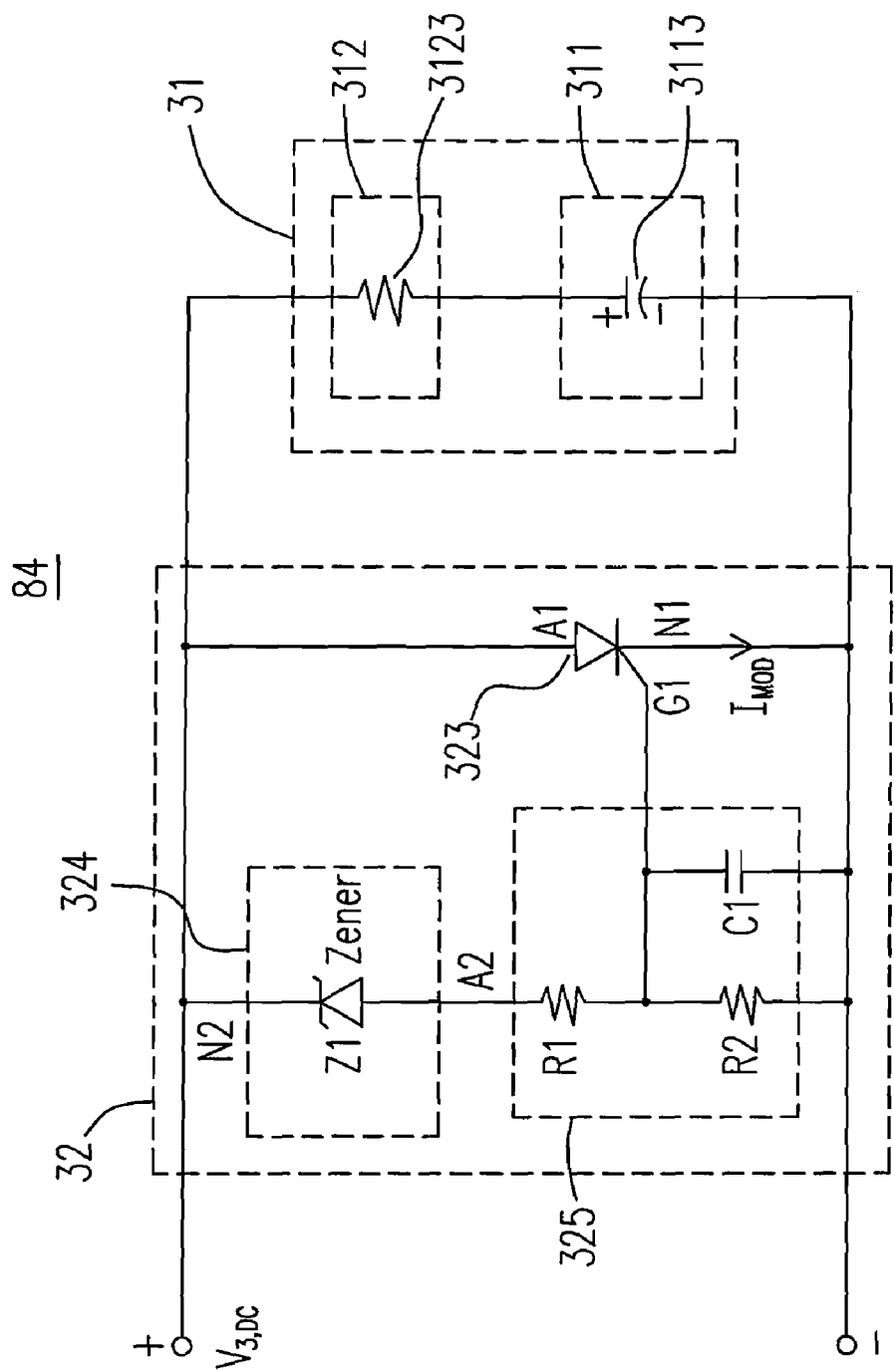
FIG. 4 is a schematic diagram showing a circuit for protecting an energy-storage device according to the third embodiment of the present invention.

Please refer to FIG. 4, which is a schematic diagram showing a circuit for protecting an energy-storage device according to the third embodiment of the present invention. The protection circuit 84 in FIG. 4 is the third configuration of the protection circuit 81 in FIG. 1. The identical reference numerals have the same functions in the two figures, and it is unnecessary to repeat here again. As shown in FIG. 4, the energy-storage device 311 includes a first capacitor 3113, the fusible element 312 includes a first resistor 3123, and the overvoltage modulation unit 32 includes a thyristor 323, an overvoltage conduction unit 324, and a voltage-division circuit 325. The overvoltage modulation unit 32 is connected in parallel with the branch circuit 31 and is powered by a DC voltage $V_{3,DC}$.

In FIG. 4, the thyristor 323 has a first anode A1, a first cathode N1, and a gate G1, wherein the first anode A1 and the first cathode N1 are connected in parallel with the branch circuit 31, and the thyristor 323 commonly involves a silicon controlled rectifier. The overvoltage conduction unit 324 has a second anode A2, a second cathode N2, and a breakdown voltage, and the element property of the overvoltage conduction unit 324 is chosen, which makes the breakdown voltage equal to the limiting voltage of the branch circuit 31. The second cathode N2 is coupled to the first anode A1 of the thyristor 323, and the overvoltage conduction unit 324 includes a Zener diode Z1 in the present embodiment. When the instantaneous voltage happened on the branch circuit 31 exceeds the limiting voltage, that is, the branch circuit 31 begins to have an overvoltage, the Zener diode Z1 is conducted instantaneously.

The voltage-division circuit 325 includes a second resistor R1, a third resistor R2 and a second capacitor C1, and is coupled to the second anode A2 of the overvoltage conduction unit 324, the first anode N1 of the thyristor 323, and the gate G1 of the thyristor 323, wherein a bias of the gate G1 of the thyristor 323 is supplied through a common connection point of the second resistor R1, the third resistor R2 and the second capacitor C1. When the Zener diode Z1 is instantaneously conducted, the voltage-division circuit 325 supplies a trigger voltage to the gate G1 of the thyristor 323. The absolute value of the modulating current $I_{MOD}$ flowing through the cathode N1 of the thyristor 323 is increased instantaneously by means of the trigger of the trigger voltage. Because the thyristor 323 is connected in parallel with the branch circuit 31, a second energy instantaneously released from the first capacitor 3113 is applied to the first resistor 3123, which makes the first resistor 3123 cut off. Therefore, the first capacitor 3113 is protected and is prevented from destruction due to the overvoltage.

Figure 5:
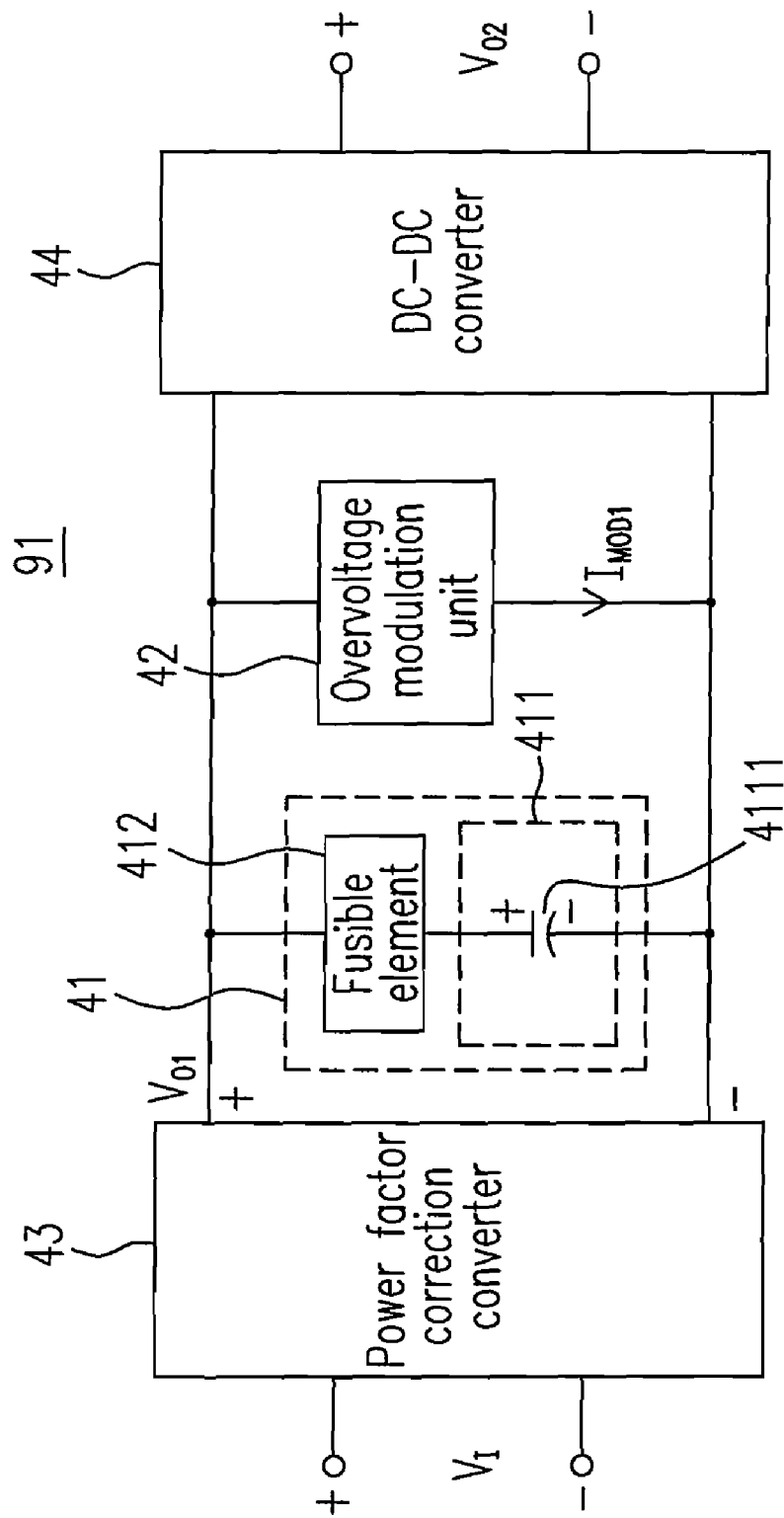
FIG. 5 is a schematic block diagram showing an application system for protecting an energy-storage device according to the present invention.

Please refer to FIG. 5, which is a schematic block diagram showing an application system for protecting an energy-storage device according to the present invention. In FIG. 5, the protection-circuit application system 91 includes a capacitive device 411, a fusible element 412, a power factor correction converter 43, and an overvoltage modulation unit 42. The capacitive device 411 stores a first energy and supplies the first energy. The capacitive device 411 includes a capacitor 4111 and has a maximum rated voltage. The fusible element 412 is connected in series with the capacitive device 411 for constituting a branch circuit 41. In order that the voltage applied to the capacitive device 411 does not exceed the maximum rated voltage thereof, the terminal voltage of the branch circuit 41 is controlled to make it less than a limiting voltage. The limiting voltage is assigned to be less than the maximum rated voltage by a safety value for preventing the capacitive device 411 from an overvoltage.

The power factor correction converter 43 is coupled to the branch circuit 41 and receives an input voltage $V_I$ for controlling a charging and a discharging of the capacitive device 411 and for producing a first output voltage $V_{O1}$ between the two terminals of the branch circuit 41. In general, the input voltage $V_I$ is supplied with an unregulated DC voltage, which is output from a full-wave rectifier (Not shown). The power factor correction converter 43 regulates the input voltage $V_I$ with voltage boost or voltage buck, and controls the charging and the discharging of the capacitive device 411 for increasing the power factor of the AC voltage between the input terminals of the full-wave rectifier. When the first output voltage $V_{O1}$ is greater than the input voltage $V_I$, the power factor correction converter 43 generally includes a boost converter. When the first output voltage $V_{O1}$ is less than the input voltage $V_I$, the power factor correction converter 43 generally includes a buck converter.

The overvoltage modulation unit 42 is connected in parallel with the branch circuit 41 and has a switching voltage and a modulating current $I_{MOD1}$. The element property of the overvoltage modulation unit 42 is chosen, which can make the switching voltage equal to the limiting voltage of the branch circuit 41. When the instantaneous voltage (equal to the first output voltage $V_{O1}$ in the present circuit) happened on the branch circuit 41 exceeds the limiting voltage or the switching voltage, that is, the branch circuit 41 begins to have an overvoltage, an absolute value of the modulating current $I_{MOD1}$ flowing through the overvoltage modulation unit 42 is increased instantaneously. Because the overvoltage modulation unit 42 is connected in parallel with the branch circuit 41, a second energy instantaneously released from the capacitive device 411 is applied to the fusible element 412, which makes the fusible element 412 cut off.

The protection-circuit application system 91 can further includes a DC-DC converter 44 which receives the first output voltage $V_{O1}$ for producing a second output voltage $V_{O2}$. The DC-DC converter 44 commonly involves a flyback converter, a half-bridge converter, or an LLC resonance converter, and so on.

Figure 6:
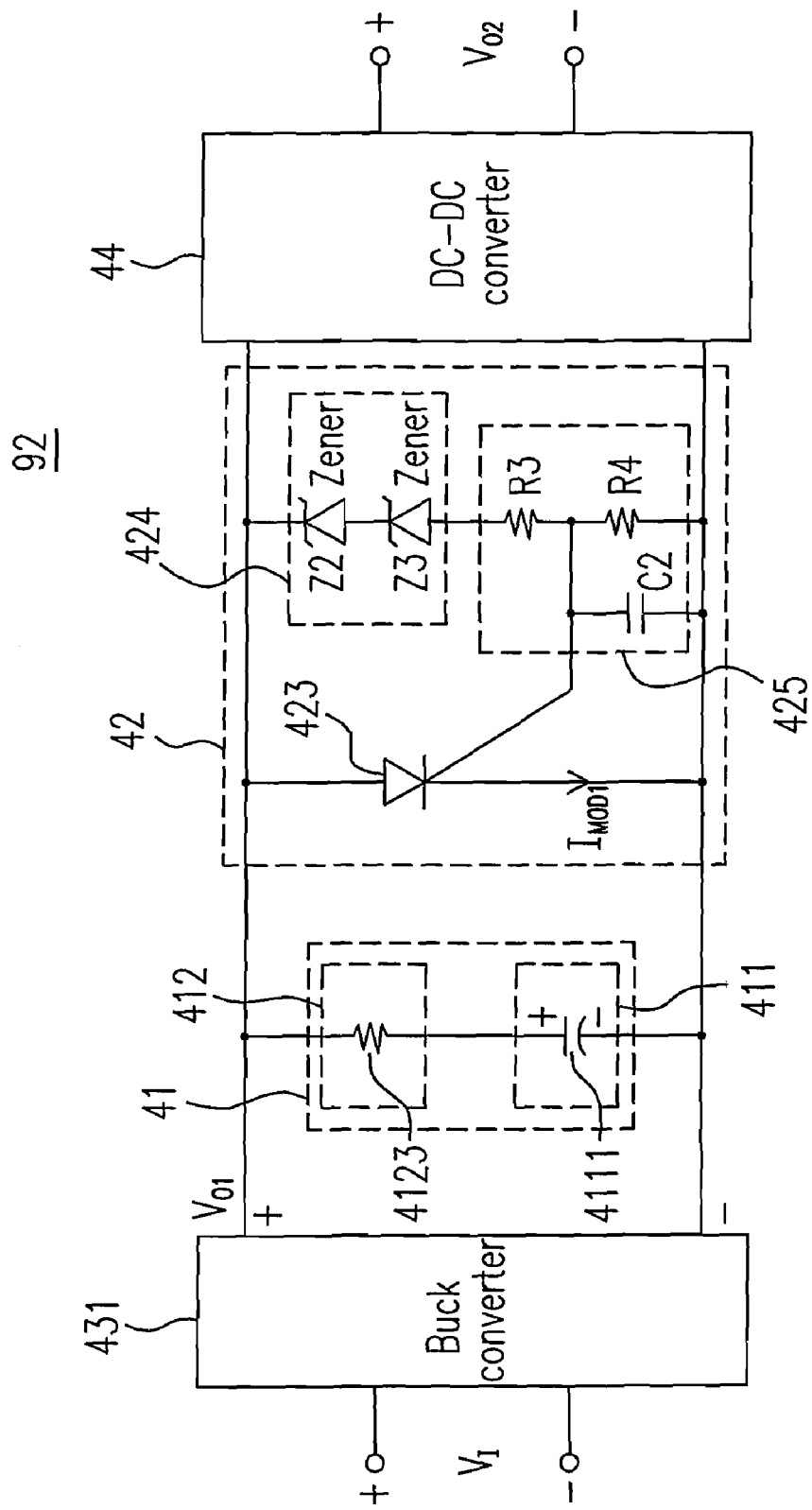
FIG. 6 is a schematic diagram showing a circuit according to the embodiment of the application system in FIG. 5 of the present invention.

Please refer to FIG. 6, which is a schematic diagram showing a circuit according to the embodiment of the application system in FIG. 5 of the present invention. The application system 92 in FIG. 6 is a configuration of the application system 91 in FIG. 5. The identical reference numerals have the same functions in the two figures, and it is unnecessary to repeat here again. As shown in FIG. 6, the application system 92 includes a capacitive device 411, a fusible element 412, a buck converter 431, and an overvoltage modulation unit 42.

The capacitive device 411 includes a capacitor 4111 and the fusible element 412 includes a resistor 4123. The overvoltage modulation unit 42 includes a thyristor 423, an overvoltage conduction unit 424, and a voltage-division circuit 425. In the present embodiment, the overvoltage conduction unit 424 includes two Zener diodes Z2 and Z3 both are connected in series for withstanding a higher voltage. All the constituents and the operation of the overvoltage modulation unit 42 are similar to those of the overvoltage modulation unit 32 in FIG. 4, and it is unnecessary to repeat here again.

The buck converter 431 is coupled to the branch circuit 41 and receives an input voltage $V_I$ for controlling a charging and a discharging of the capacitive device 411 and for producing a first output voltage $V_{O1}$, less than the input voltage $V_I$, between the two terminals of the branch circuit 41.

Afterward, please refer to FIG. 1 again. A method for protecting an energy-storage device 311 is described according to the present invention, wherein the energy-storage device 311 is used for storing a first energy and is connected in series with a fusible element 312 for constituting a branch circuit 31 connected in parallel with an overvoltage modulation unit 32. The method includes the following steps. Firstly, an instantaneous increase of an absolute value of a modulating current $I_{MOD}$ flowing through the overvoltage modulation unit 32 is caused when the branch circuit 31 begins to have an overvoltage. Next, a second energy is instantaneously released from the energy-storage device 311 by the instantaneous increase of the absolute value, so that the fusible element 32 is cut off.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A protection circuit, comprising:
   a capacitive device storing and supplying a first electrical energy;
   a fusible element connected in series with the capacitive device for constituting a branch circuit;
   a power factor correction converter including a buck converter, wherein the buck converter provides the first electrical energy to the capacitive device and is coupled to the branch circuit for controlling a charging and a discharging of the capacitive device; and
   an overvoltage modulation unit connected in parallel with the branch circuit, wherein:
   the overvoltage modulation unit includes a thyristor having a gate and connected in parallel with the branch circuit, an overvoltage conduction unit, and a voltage-division circuit electrically connected to the thyristor and the overvoltage conduction unit;
   when the branch circuit begins to have an overvoltage, the overvoltage conduction unit instantaneously conducts for causing the voltage-division circuit supplying a trigger voltage to the gate of the thyristor; and
   an absolute value of a modulating current flowing through the overvoltage modulation unit is increased instantaneously by a trigger of the trigger voltage, so that a second electrical energy in the first electrical energy instantaneously released from the capacitive device is applied to cut off the fusible element.

2. A protection circuit according to claim 1, wherein the capacitive device comprises a capacitor.

3. A protection circuit according to claim 1, wherein the fusible element comprises a resistor, and the fusible element is connected in series with the capacitive device.

4. A protection circuit according to claim 1, wherein the fusible element comprises a fuse.

5. A protection circuit according to claim 1, wherein
   the thyristor further has a first anode and a first cathode, wherein the first anode and the first cathode are connected in parallel with the branch circuit, and the absolute value of the modulating current flowing through the first cathode is increased instantaneously when the branch circuit begins to have the overvoltage;
   the overvoltage conduction unit has a second anode, a second cathode coupled to the first anode, and a breakdown voltage, and is instantaneously conducted when the branch circuit begins to have the overvoltage; and
   the voltage-division circuit has a first resistor, a second resistor, and a capacitor, and is coupled to the second anode, the first cathode and the gate, wherein a bias of the gate is supplied through a common connection point of the first resistor, the second resistor, and the capacitor.

6. A protection circuit according to claim 5, wherein the thyristor comprises a silicon controlled rectifier.

7. A protection circuit according to claim 5, wherein the overvoltage conduction unit comprises at least a Zener diode.

8. A method for protecting an energy-storage device, wherein the energy-storage device is used for storing a first energy, is coupled to a buck converter providing the first energy, and is connected in series with a fusible element for constituting a branch circuit connected in parallel with an overvoltage modulation unit, the overvoltage modulation unit includes a thyristor having a gate and connected in parallel with the branch circuit, an overvoltage conduction unit, and a voltage-division circuit electrically connected to the thyristor and the overvoltage conduction unit, and the method comprising steps of:

conducting the overvoltage conduction unit instantaneously when the branch circuit begins to have an overvoltage for causing the voltage-division circuit supplying a trigger voltage to the gate of the thyristor; and causing an instantaneous increase of an absolute value of a modulating current flowing through the overvoltage modulation unit by a trigger of the trigger voltage; and releasing a second energy in the first energy instantaneously from the energy-storage device by the instantaneous increase of the absolute value, so that the fusible element is cut off.

9. A method for protecting an energy-storage device according to claim 8, wherein the thyristor comprises a silicon controlled rectifier and the overvoltage conduction unit further comprises at least a Zener diode.

10. A method for protecting an energy-storage device according to claim 8, further comprising a step of: converting the second energy into a thermal energy for burning out the fusible element.

11. A protection circuit, comprising:

an energy-storage device storing and supplying a first energy;

a fusible element connected in series with the energy-storage device for constituting a branch circuit;

a buck converter coupled to the branch circuit and providing the first energy to the energy-storage device; and an overvoltage modulation unit connected in parallel with the branch circuit, wherein:

the overvoltage modulation unit includes a thyristor having a gate and connected in parallel with the branch circuit, an overvoltage conduction unit, and a voltage-division circuit electrically connected to the thyristor and the overvoltage conduction unit;

when the branch circuit begins to have an overvoltage, the overvoltage conduction unit instantaneously conducts for causing the voltage-division circuit supplying a trigger voltage to the gate of the thyristor; and an absolute value of a modulating current flowing through the overvoltage modulation unit is increased instantaneously, so that a second energy in the first energy instantaneously released from the energy-storage device is applied to cut off the fusible element.

12. A protection circuit according to claim 11, wherein the energy-storage device comprises a capacitor.

13. A protection circuit according to claim 11, wherein the fusible element comprises a resistor, and the fusible element is connected in series with the energy-storage device.

14. A protection circuit according to claim 11, wherein the fusible element comprises a fuse.

\* \* \* \* \*